United States Patent
Sun et al.

(10) Patent No.: US 11,054,986 B2
(45) Date of Patent: *Jul. 6, 2021

(54) APPARATUS INCLUDING A TOUCH SCREEN UNDER A MULTI-APPLICATION ENVIRONMENT AND CONTROLLING METHOD THEREOF

(71) Applicant: Samsung Electronics Co., Ltd., Suwon-si (KR)

(72) Inventors: Kwang-Won Sun, Suwon-si (KR); Kang-Tae Kim, Yongin-si (KR); Eun-Young Kim, Yongin-si (KR); Chul-Joo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,482

(22) Filed: Oct. 18, 2019

(65) Prior Publication Data

US 2020/0050359 A1 Feb. 13, 2020

Related U.S. Application Data

(63) Continuation of application No. 13/679,146, filed on Nov. 16, 2012, now abandoned.

(30) Foreign Application Priority Data

Nov. 16, 2011 (KR) .................... 10-2011-0119824

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/0412* (2013.01); *G06F 3/0416* (2013.01);
(Continued)

(58) Field of Classification Search
CPC ............... G06F 3/04883; G06F 3/0484; G06F 2203/04803; G06F 3/0412; G06F 3/0416; G06F 3/14; G06F 2203/04808
(Continued)

(56) References Cited

U.S. PATENT DOCUMENTS

| 6,686,852 B1 | 2/2004 | Guo |
| 7,216,305 B1 | 5/2007 | Jaeger |

(Continued)

FOREIGN PATENT DOCUMENTS

| CN | 1344989 A | 4/2002 |
| CN | 1458576 A | 11/2003 |

(Continued)

OTHER PUBLICATIONS

Korean Office Action with English translation dated Dec. 28, 2018; Korean Appln. No. 10-2018-01166133.

*Primary Examiner* — Renee D Chavez
*Assistant Examiner* — Jianmei F Duckworth
(74) *Attorney, Agent, or Firm* — Jefferson IP Law, LLP

(57) ABSTRACT

An apparatus including a touch screen is provided. The apparatus includes the touch screen to display a first window for executing a first application and a second window for executing a second application, and a controller to detect whether a display change event for changing a screen display occurs in at least one of the first window and the second window, and to analyze the display change event in order to rotate a display direction of the at least one of the first window and the second window in which the display change event occurs.

15 Claims, 13 Drawing Sheets

(51) Int. Cl.
  *G06F 3/0484* (2013.01)
  *G06F 3/041* (2006.01)
  *G06F 3/14* (2006.01)

(52) U.S. Cl.
  CPC .............. *G06F 3/0484* (2013.01); *G06F 3/14* (2013.01); *G06F 2203/04803* (2013.01); *G06F 2203/04808* (2013.01)

(58) Field of Classification Search
  USPC ........................................................ 715/788
  See application file for complete search history.

(56) References Cited

U.S. PATENT DOCUMENTS

| | | | |
|---|---|---|---|
| 7,840,912 B2 | 11/2010 | Elias et al. | |
| 7,978,182 B2 | 7/2011 | Carding et al. | |
| 8,271,907 B2 | 9/2012 | Kim et al. | |
| 8,854,318 B2 | 10/2014 | Borovsky et al. | |
| 2003/0076362 A1 | 4/2003 | Terada | |
| 2003/0184525 A1 | 10/2003 | Tsai | |
| 2004/0056903 A1 | 3/2004 | Sakai | |
| 2005/0108620 A1 | 5/2005 | Allyn et al. | |
| 2005/0114788 A1 | 5/2005 | Fabritius | |
| 2005/0235220 A1 | 10/2005 | Duperrouzel et al. | |
| 2006/0001650 A1 | 1/2006 | Robbins et al. | |
| 2006/0156249 A1 | 7/2006 | Blythe et al. | |
| 2007/0192726 A1 | 8/2007 | Kim et al. | |
| 2008/0115091 A1 | 5/2008 | Jung et al. | |
| 2008/0172609 A1 | 7/2008 | Rytivaara | |
| 2008/0174570 A1 | 7/2008 | Jobs et al. | |
| 2008/0214239 A1 | 9/2008 | Hashimoto et al. | |
| 2008/0320396 A1 | 12/2008 | Mizrachi et al. | |
| 2009/0207138 A1 | 8/2009 | Thorn | |
| 2009/0225040 A1 | 9/2009 | Whytock | |
| 2009/0259967 A1 | 10/2009 | Davidson et al. | |
| 2009/0307631 A1 | 12/2009 | Kim et al. | |
| 2009/0322690 A1 | 12/2009 | Hiltunen et al. | |
| 2010/0058254 A1* | 3/2010 | Narita ................. | G06F 3/0481 715/863 |
| 2010/0062811 A1 | 3/2010 | Park et al. | |
| 2010/0066698 A1 | 3/2010 | Seo | |
| 2010/0081475 A1 | 4/2010 | Chiang et al. | |
| 2010/0088634 A1 | 4/2010 | Tsuruta et al. | |
| 2010/0125816 A1 | 5/2010 | Bezos | |
| 2010/0214278 A1 | 8/2010 | Miura | |
| 2010/0248788 A1 | 9/2010 | Yook et al. | |
| 2011/0018821 A1 | 1/2011 | Kii | |
| 2011/0175930 A1 | 7/2011 | Hwang et al. | |
| 2012/0056878 A1* | 3/2012 | Miyazawa .......... | G06F 3/04815 345/419 |
| 2012/0084721 A1 | 4/2012 | Gimpl et al. | |
| 2012/0176322 A1 | 7/2012 | Karmi et al. | |
| 2012/0289290 A1 | 11/2012 | Chae et al. | |
| 2012/0290966 A1 | 11/2012 | Chae et al. | |
| 2012/0303476 A1 | 11/2012 | Krzyzanowski et al. | |
| 2014/0245217 A1 | 8/2014 | Asahara | |

FOREIGN PATENT DOCUMENTS

| | | |
|---|---|---|
| CN | 101352057 A | 1/2009 |
| CN | 101866263 A | 10/2010 |
| CN | 101939721 A | 1/2011 |
| JP | 10-260784 A | 9/1998 |
| JP | 2004-046796 A | 2/2004 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 12/2006 |
| KR | 10-0700171 B1 | 3/2007 |
| KR | 10-0782075 B1 | 12/2007 |
| KR | 10-2009-0016044 A | 2/2009 |
| KR | 10-0900295 B1 | 5/2009 |
| KR | 10-2010-0030968 A | 3/2010 |
| KR | 10-2010-0053823 A | 5/2010 |
| KR | 10-2010-0076499 A | 7/2010 |
| KR | 10-2010-0107377 A | 10/2010 |
| KR | 10-2010-0125927 A | 12/2010 |
| KR | 10-2011-0050248 A | 5/2011 |
| KR | 10-2011-0063409 A | 6/2011 |
| KR | 10-2011-0082494 A | 7/2011 |
| KR | 10-2011-0085233 A | 7/2011 |
| WO | 2008/090902 A1 | 7/2008 |
| WO | 2009/017175 A1 | 2/2009 |
| WO | 2009/028892 A2 | 3/2009 |

* cited by examiner

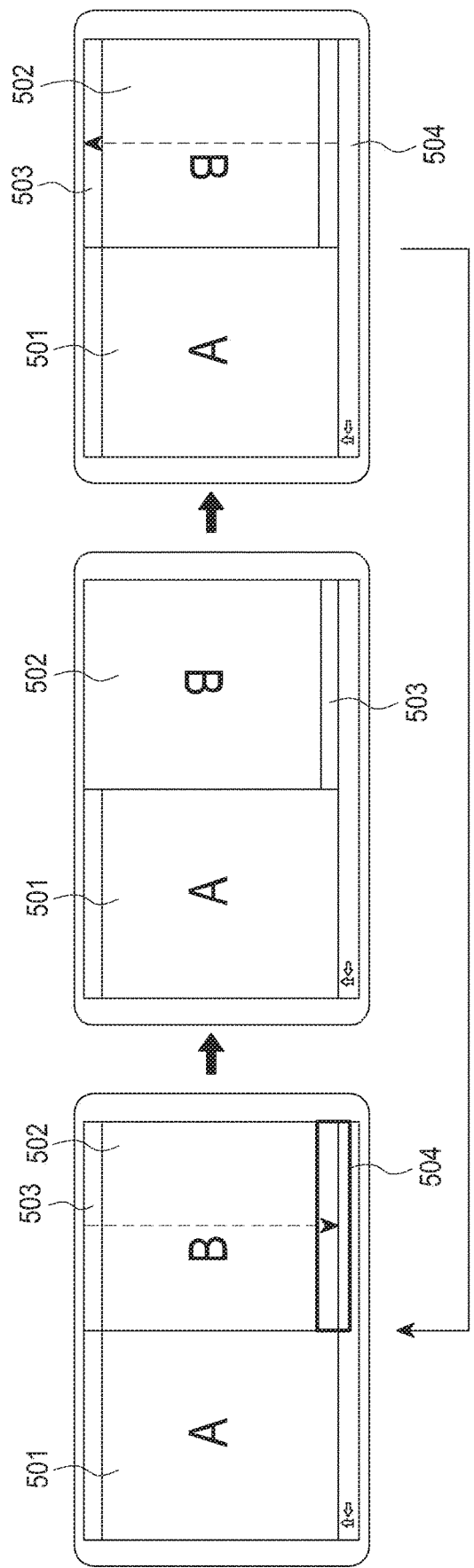

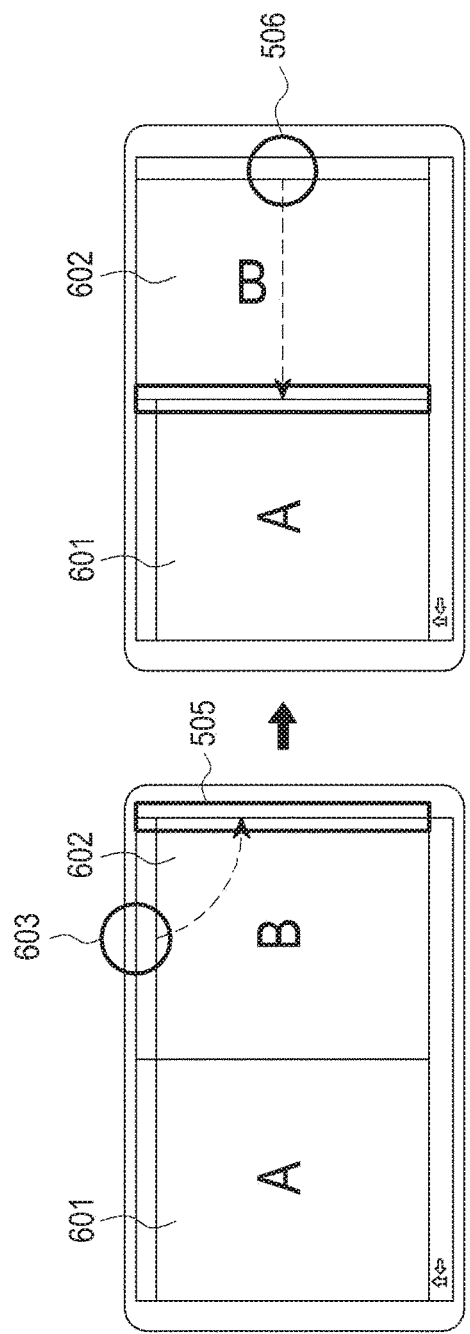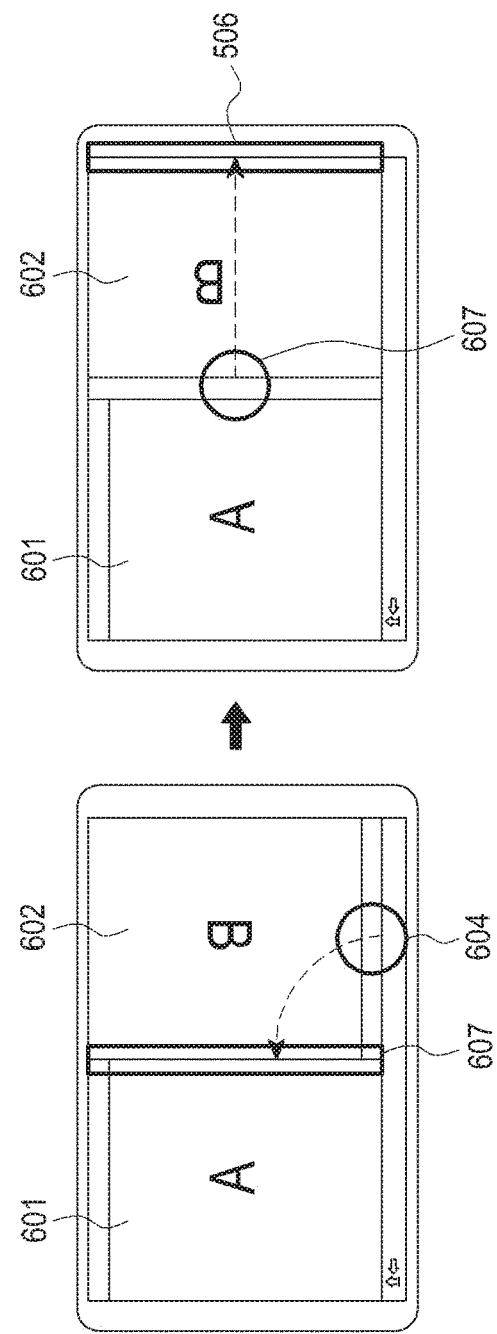

APPARATUS INCLUDING A TOUCH SCREEN UNDER A MULTI-APPLICATION ENVIRONMENT AND CONTROLLING METHOD THEREOF

PRIORITY

This application is a continuation application of prior application Ser. No. 13/679,146, filed on Nov. 16, 2012, and was based on and claimed the priority under 35 U.S.C. § 119(a) of a Korean patent application number 10-2011-0119824, filed on Nov. 16, 2011, in the Korean Intellectual Property Office, the disclosure of each of which is incorporated by reference herein in its entirety.

BACKGROUND OF THE INVENTION

1. Field of the Invention

The present invention relates to an apparatus including a touch screen under a multi-application environment and a control method thereof. More particularly, the present invention relates to an apparatus including a touch screen that executes multiple applications in a screen that is divided into at least two independent regions of the touch screen and a control method thereof.

2. Description of the Related Art

As demand for smart phones, tablets, and other similar portable electronic devices has rapidly increased, research on user interface methods associated with a touch screen contained in the smart phones, the tablets, and the portable electronic devices has been actively conducted. In particular, research has been conducted so as to provide an interface method that may be used according to intuition associated with a user experience, and various interface methods that correspond with a user's intuition have been provided.

Particularly, many smart phones, tablets, and portable electronic devices include a touch screen and thus, the recent research on the interface method has been directed towards development of methods that enable users to readily and accurately manipulate a touch screen.

In a case where a single application is executed, a related-art smart phone, tablet, or portable electronic device may employ an architecture that displays, on the entire touch screen, a window for displaying the single application. Accordingly, when a user of a smart phone, a tablet, or a portable electronic device desires to execute another application while displaying an application, the smart phone, tablet, or portable electronic device may stop displaying the displayed application and may display the other application. When the user desires to execute another application, the user may need to perform a manipulation for switching a screen into an initial menu screen, and may need to perform, on the menu screen, another manipulation for executing the other application.

When the user performs multi-tasking using a plurality of applications, there may be an inconvenience to the user in that the user continuously performs manipulation for switching a screen between applications, and there may be a drawback in that the user may not readily recognize or easily determine the progress of the applications executing tasks or operations.

Also, when a plurality of users use a single smart phone or tablet, there may be an inconvenience in that a workspace of each user may overlap each other.

Therefore, there is a need for a display architecture that divides a single touch screen and that displays each application when a plurality of applications are executed, and a method that effectively displays the applications in the divided screens.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an architecture that divides a single touch screen and displays each application when a plurality of applications are executed, and a method that controls an application display screen according to a user selection in each divided screen.

In accordance with an aspect of the present invention, an apparatus including a touch screen is provided. The apparatus includes the touch screen to display a first window for executing a first application and a second window for executing a second application, and a controller to detect whether a display change event for changing a screen display occurs in at least one of the first window and the second window, and to analyze the display change event in order to rotate a display direction of the at least one of the first window and the second window in which the display change event occurs.

In accordance with another aspect of the present invention, a method of controlling an apparatus including a touch screen displaying a first window for executing a first application and a second window for executing a second application is provided. The method includes displaying the first application on the first window and the second application on the second window, detecting whether a display change event for changing a screen display occurs on at least one of the first window and the second window, analyzing the display change event occurring on the at least one of the first window and the second window, and rotating a display direction of the at least one of the first window and the second window according to the analyzed display change event.

According to various exemplary embodiments of the present invention, there may be provided an architecture that divides a single touch screen and displays each application in respective part of the divided single touch screen when a plurality of applications are executed, and a method that controls an application display screen to comply with user intuition in each divided screen.

Accordingly, the user may readily recognize the progress of the applications when manipulating a touch screen in which the plurality of applications is displayed on divided screens. Also, when a plurality of users work by sharing a single smart phone or tablet, workspaces may not overlap each other and thus, an effective work environment may be provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the certain exemplary embodiments of the present invention will be more apparent from the following description taken in conjunction with the accompanying drawings, in which:

FIGS. 5A through 5C are diagrams illustrating a touch screen that includes a reversal region according to various exemplary embodiments of the present invention;

FIGS. 6A through 6D are diagrams illustrating a display change event and a changed screen according to another exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
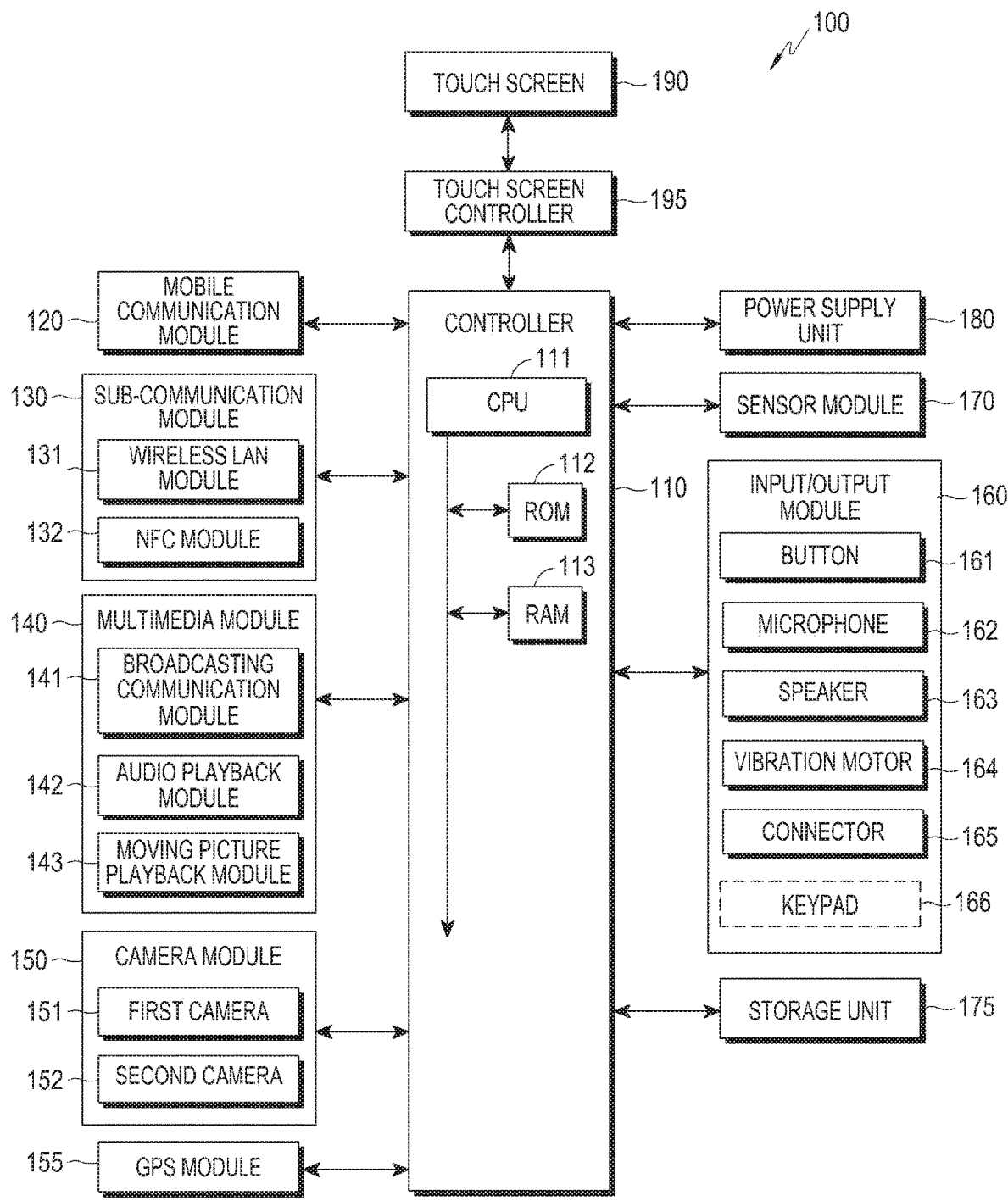
FIG. 1A is a block diagram illustrating an apparatus including a touch screen according to an exemplary embodiment of the present invention.

FIG. 1A is a block diagram illustrating an apparatus including a touch screen according to an exemplary embodiment of the present invention.

Referring to FIG. 1A, an apparatus 100 including a touch screen 190 may be connected to an external apparatus (not illustrated) using a mobile communication module 120, a sub-communication module 130, and a connector 165. Although not illustrated, the external apparatus may include at least one of another apparatus, a portable phone, a smart phone, a tablet Personal Computer (PC), a server, or any other similar electronic device and/or apparatus.

Referring to FIG. 1A, the apparatus 100 may include the touch screen 190 and a touch screen controller 195. The apparatus 100 may further include a controller 110, the mobile communication module 120, the sub-communication module 130, a multimedia module 140, a camera module 150, a Global Positioning System (GPS) module 155, an input/output module 160, a sensor module 170, a storage unit 175, and a power supply unit 180. The sub-communication module 130 may include at least one of a wireless Local Area Network (LAN) module 131 and a Near Field Communication (NFC) module 132, and the multimedia module 140 may include at least one of a broadcasting communication module 141, an audio playback module 142, and a moving picture playback module 143. The camera module 150 may include at least one of a first camera 151 and a second camera 152. The input/output module 160 may include at least one of a button 161, a microphone 162, a speaker 163, a vibration motor 164, the connector 165, and a keypad 166.

The controller 110 may include a Central Processing Unit (CPU) 111, a Read Only Memory (ROM) 112 storing a control program for controlling the apparatus 100, and a Random Access Memory (RAM) 113 storing a signal or data input from the outside of the apparatus 100 or that is used as a memory region for an operation performed in the apparatus 100. The CPU 111 may be a single core processor, a dual-core processor, a triple-core processor, a quad-core processor, or any other suitable and/or similar type of processor. The CPU 111, the ROM 112, and the RAM 113 may be mutually connected through an internal bus or through any suitable and/or similar manner. The controller 110 may control the mobile communication module 120, the sub-communication module 130, the multimedia module 140, the camera module 150, the GPS module 155, the input/output module 160, the sensor module 170, the storage unit 175, the power supply unit 180, a touch screen 190, the touch screen controller 195, and any other element of the apparatus 100.

The mobile communication module 120 connects the apparatus 100 to an external apparatus through mobile communication, using at least one antenna according to the control of the controller 110. The mobile communication module 120 transmits and receives a wireless signal for a voice call, a video call, a Short Message Service (SMS), Multimedia Message Service (MIMS), or any other similar and/or suitable wireless signal for mobile communication and/or wireless communications.

The sub-communication module 130 may include at least one of the wireless LAN module 131 and the NFC module 132. For example, the sub-communication module 130 may include only the wireless LAN module 131, may include only the NFC module 132, or may include both the wireless LAN module 131 and the NFC module 132. The wireless LAN module 131 may be connected to the Internet at a place where a wireless Access Point (AP) (not illustrated) is installed, based on the control of the controller 110. The wireless LAN module 131 may support at least one of a variety of wireless LAN standards and/or communication systems. The NFC module 132 may wirelessly perform NFC between the apparatus 100 and any other apparatus (not illustrated) that supports NFC according to the controlling of the controller 110. The NFC scheme may include Bluetooth, Infrared Data Association (IrDA), or any other similar and/or suitable communication scheme.

The apparatus 100 may include at least one of the mobile communication module 120, the wireless LAN module 131, and the NFC module 132. For example, the apparatus 100 may include any combination of the mobile communication module 120, the wireless LAN module 131, and the NFC module 132.

The multimedia module 140 may include any combination of the broadcasting communication module 141, the audio playback module 142, and the moving picture playback module 143. The broadcasting communication module 141 may receive a broadcasting signal, for example, a TV broadcasting signal, a radio broadcasting signal, or a data broadcasting signal, and broadcasting subsidiary information, for example, an Electronic Program Guide (EPS) or Electronic Service Guide (ESG), transmitted from a broadcasting station, through a broadcasting communication antenna (not illustrated), according to the control of the controller 110. The audio playback module 142 may play back a stored or received digital audio file according to the controlling of the controller 110. The moving picture playback module 143 may play back a stored or received digital moving picture file according to the control of the controller 110. The moving picture playback module 143 may play back a digital audio file, or any other similar and/or suitable type of file that may be displayed or played back using the apparatus 100. Also, the audio playback module 142 and the moving picture playback module 143 of the multimedia module 140 may be included in the controller 100.

The camera module 150 may include at least one of the first camera 151 and the second camera 152 that may capture a still image and a moving picture according to the control of the controller 110. Also, the first camera 151 or the second camera 152 may include a secondary light source, for example, a flash (not illustrated), that provides additional light for capturing an image. For another example, the first camera 151 and the second camera 152 may be disposed close to each other, for example, a distance between the first camera 151 and the second camera 152 is greater than 1 cm and less than 8 cm, and thus, a 3-Dimensional (3D) still image and a 3D moving picture may be captured. Furthermore, the first camera 151 and the second camera 152 may be disposed on a front side and a back side of the apparatus 100, respectively, or may be disposed in any similar and/or suitable manner on the apparatus 100 so as to allow the capturing of still images and moving pictures.

The GPS module 155 may receive a signal from at least one GPS satellite (not illustrated) in the earth's orbit, and may calculate a location of the apparatus 100 according to the signal received from the at least one GPS satellite. The input/output module 160 may include at least one of the button 161, or a plurality of buttons (not illustrated), the microphone 162, the speaker 163, the vibration motor 164, the connector 165, and the keypad 166. The microphone 162 receives an input of a voice or a sound and generates an electric signal according to the control of the controller 110. The apparatus 100 may include a plurality of the microphones 162.

The speaker 163 may output, to the outside of the apparatus 100, a sound corresponding to various signals, for example, a wireless signal, a broadcasting signal, a digital audio file, a digital moving picture file, an image capturing signal, and any other suitable and/or similar signal that may be outputted through the speaker 163. The speaker 163 may output a sound, for example, a button manipulation sound corresponding to a phone call or a ring-back tone, or any other similar and/or suitable sound that may be outputted through the speaker 163 corresponding to a function performed by the apparatus 100, and the speaker 163 may also output a sound that responds to a motion of a touch gesture on the touch screen 190.

The vibration motor 164 may convert an electric signal into a mechanical vibration according to the control of the controller 110. For example, when the apparatus 100 that is in a vibration mode receives a voice call from another device (not illustrated), the vibration motor 164 may operate. Also, the vibration motor 164 of the apparatus 100 may operate in response to a touch on the touch screen 190, or may operate according to any other design feature, operation and application of the apparatus 100.

The connector 165 may connect the apparatus 100 to an external apparatus (not illustrated), a power source (not illustrated), or any other similar and/or suitable external unit. According to the control of the controller 110, data stored in the storage unit 175 of the apparatus 100 may be transmitted to the external apparatus or data may be received from the external apparatus through a wired cable connected to the connector 165. Through the wired cable connected to the connector 165, power may be input from the power source, or a battery (not illustrated) may be charged. The keypad 166 may receive a key input from the user for control the apparatus 100. The keypad 166 may include a physical keypad (not illustrated) formed on the apparatus 100, a virtual keypad (not illustrated) displayed on the touch screen 190, or any other similar and/or suitable device for receiving a key input.

The sensor module 170 includes at least one sensor to detect a state of the apparatus 100. For example, the sensor module 170 may include at least one of a proximity sensor to detect proximity of the user to the apparatus 100, an illuminance sensor to detect an amount of light around the apparatus 100, and a motion sensor (not illustrated) to detect a motion of the apparatus 100, for example, rotation of the apparatus 100 and acceleration, vibration, and shaking applied to the apparatus 100. The at least one sensor may detect the state, and may generate a signal corresponding to the detection so as to transmit the generated signal. A sensor of the sensor module 170 may be added or removed according to a design of the apparatus 100.

The storage unit 175 may store a signal and/or data input/output in association with an operation of the mobile communication module 120, the sub-communication module 130, the multimedia module 140, the camera module 150, the GPS module 155, the input/output module 160, the sensor module 170, the touch screen 190, or any other element of the apparatus 100, according to the control of the controller 110. The storage unit 175 may store a control program for control the apparatus 100, the controller 110, or any other element of the apparatus 100.

The term "storage unit" may refer to the storage unit 175, the ROM 112 and the RAM 113 included in the controller 110, or a memory card (not illustrated), for example, an SD card and a memory stick that may be contained in the apparatus 100. The storage unit may include a non-volatile memory, a volatile memory, a Hard Disk Drive (HDD), a Solid State Drive (SSD), or any other suitable element for storing information.

The power supply unit 180 may supply power to at least one battery (not shown) according to the control of the controller 110. The at least one battery may provide power to the apparatus 100. Also, the power supply unit 180 may supply power input from an external power source (not illustrated) through the wired cable connected to the connector 165 in order to provide power for operation of the apparatus 100 or to charge the battery.

The touch screen 190 may provide a user with user interfaces corresponding to various services, for example, communication, data transmission, broadcasting, and image capturing. The touch screen 190 may transmit, to the touch screen controller 195, an analog signal corresponding to at least one touch input to a user interface. The touch screen 190 may receive an input of at least one touch through a body part of the user, for example, a finger including a thumb, or a touch device, for example, a stylus pen. Also, the touch screen 190 may receive an input of successive motions of one touch from among the at least one touch. The touch screen 190 may transmit, to the touch screen controller 195, an analog signal corresponding to the successive motions of the input touch.

Furthermore, the touch may not be limited to detecting a contact between the touch screen 190 and a body part of the user or a touch device, and may detect a non-contact gesture, for example, a gesture having a detectable distance between the touch screen 190 and the body part of the user or the touch device that is less than or equal to 1 mm. The detectable distance that may be detected by the touch screen 190 may be any suitable distance according to a performance and/or a configuration of the apparatus 100. The touch screen 190 may be any suitable type of touch-sensitive device, such as a resistive type, a capacitive type, an infrared type, or an acoustic wave type.

The touch screen controller 195 may convert an analog signal received from the touch screen 190 into a digital signal, for example, X and Y coordinates, and may transmit the converted digital signal to the controller 110. The controller 110 may control the touch screen 190 using the digital signal received from the controller 195. For example, the controller 110 may control so as to select a shortcut icon (not illustrated) displayed on the touch screen 190 or to execute the short icon (not illustrated), in response to a touch. Also, the touch screen controller 195 may be included in the controller 110.

Figure 1B:
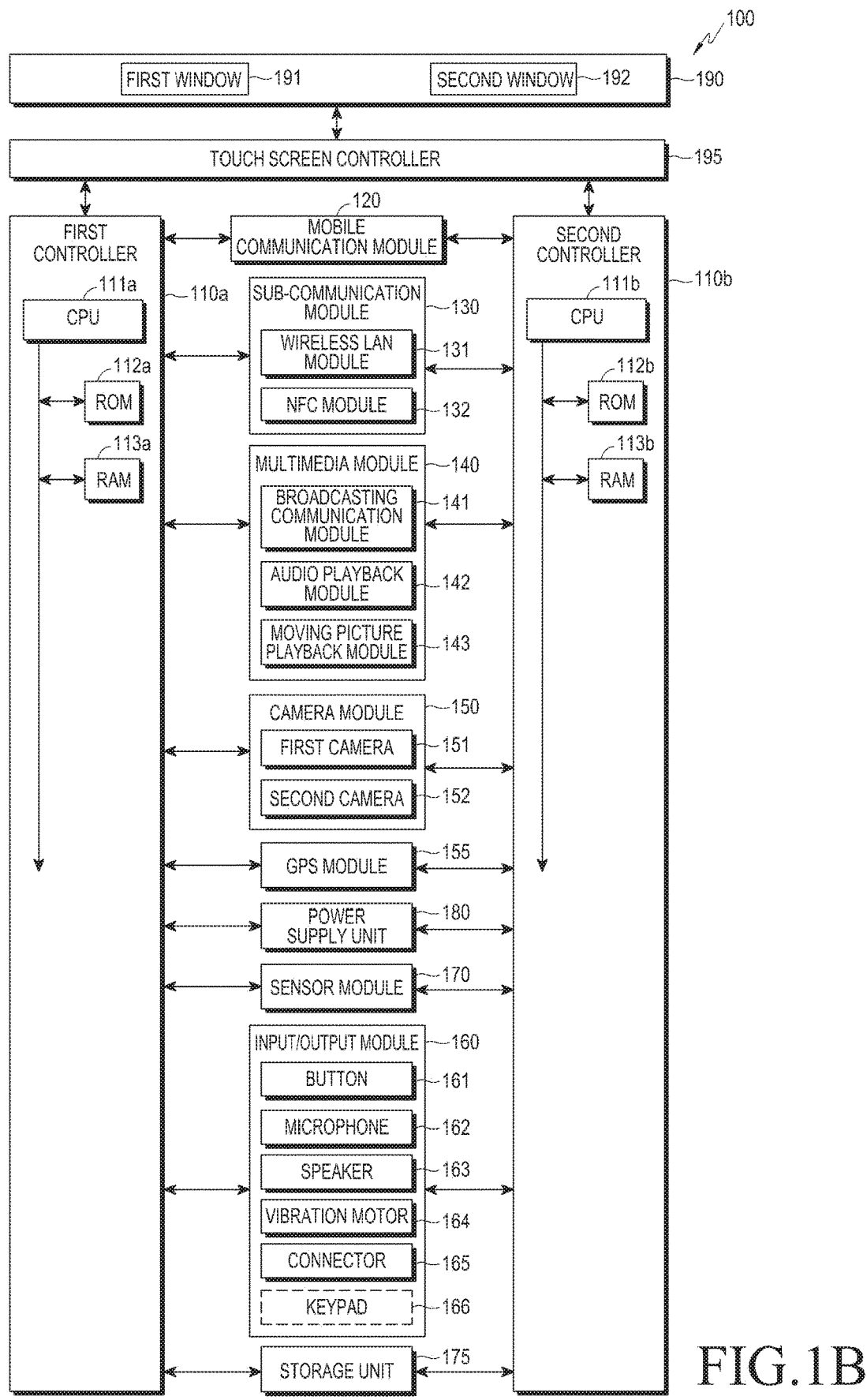
FIG. 1B is a block diagram illustrating an apparatus according to another exemplary embodiment of the present invention.

FIG. 1B is a block diagram illustrating an apparatus according to another exemplary embodiment of the present invention.

Referring to FIG. 1B, the apparatus 100 includes substantially the same component elements as the component elements illustrated in FIG. 1A, and further includes a first controller 110a, a second controller 110b, and the touch screen 190 and thus, redundant descriptions will be omitted for the purpose of brevity.

The first controller 110a may include a CPU 111a, a ROM 112a storing a control program for controlling the apparatus 100, and a RAM 113a that stores a signal or data input from the outside of the apparatus 100, or is used as a memory for an operation performed in the apparatus 100.

The first controller 110a may control the mobile communication module 120, the sub-communication module 130, the multimedia module 140, the camera module 150, the GPS module 155, the input/output module 160, the sensor module 170, the storage unit 175, the power supply unit 180, a first window 191 of the touch screen 190, and the touch screen controller 195. Here, the first window 191 and a second window 192 indicate independent regions of the touch screen 190 that are divided from each other. Although the first window 191 and the second window 192 may be embodied by dividing the entire touch screen 190, the present invention is not limited thereto and the first window 191 and the second window 192 may be any respective part of the touch screen 190. The first window 191 and the second window 192 may be independent regions included in the entire touch screen 190. The first window 191 and the second window 192 may be considered as independent divided regions of the touch screen 190 with respect to a view of the user. With respect to hardware, the first window 191 and the second window 192 may be independent and divided sets of pixels included in the touch screen 190. A conceptual positional relationship between the first window 191 and the second window 192 will be described in detail.

The touch screen controller 195 may convert an analog signal received from the touch screen 190 corresponding to a touch to the first region 191 into a digital signal, for example, X and Y coordinates, and may transmit the converted signal to the first controller 110a. The controller 110a may control the first window 191 of the touch screen 190 using the digital signal received from the touch screen controller 195. Also, the touch screen controller 195 may be included in the controller 110a.

The second controller 110b may include a CPU 111b, a ROM 112b storing a control program for controlling the apparatus 100, and a RAM 113b that stores a signal or data input from the outside of the apparatus 100 or is used as a memory for an operation performed in the apparatus 100. The second controller 110b may control the mobile communication module 120, the sub-communication module 130, the multimedia module 140, the camera module 150, the GPS module 155, the input/output module 160, the sensor module 170, the storage unit 175, the power supply unit 180, the touch screen controller 195, the touch screen 190, and particularly, the second region 192 of the touch screen 190.

The touch screen controller 195 may convert an analog signal received from the touch screen 190 corresponding to a touch to the second region 192 into a digital signal, for example, X and Y coordinates, and may transmit the converted signal to the second controller 110b. The second controller 110b may control the touch screen 190, and particularly, an area of the touch screen corresponding to the second window 192, using the digital signal received from the touch screen controller 195. Also, the touch screen controller 195 may be included in the second controller 110b.

According to an exemplary embodiment of the present invention, the first controller 110a may control at least one component element, for example, the touch screen 190, the touch screen controller 195, the mobile communication module 120, the sub-communication module 130, the multimedia module 140, the first camera 151, the GPS module 155, a power/lock button (not illustrated), at least one volume button (not illustrated), the sensor module 170, the storage unit 175, the power supply unit 180. The second controller 110b may also control at least one component element, for example, the touch screen 190, the touch screen controller 195, the second camera 152, the storage unit 175, and the power supply unit 180.

According to another exemplary embodiment of the present invention, the first controller 110a and the second controller 110b may control the component elements of the apparatus 100 based on a module unit, for example, the first controller 110a controls the mobile communication module 120, the sub-communication module 130, and the input/output module 160, and the second controller 110b controls the multimedia module 140, the camera module 150, the GPS module 155, and the sensor module 170. The first controller 110a and the second controller 110b may control the component elements of the apparatus 100 according to a priority, for example, the first controller 110a may give priority to the mobile communication module 120 and the second controller 110b may give priority to the multimedia module 140. The first controller 110a and the second controller 110b may be separated from each other. Also, the first controller 110a and the second controller 110b may be embodied in a single controller including a CPU having a plurality of cores such as a dual-core, or may be any suitable and/or similar processor type.

Figure 2:
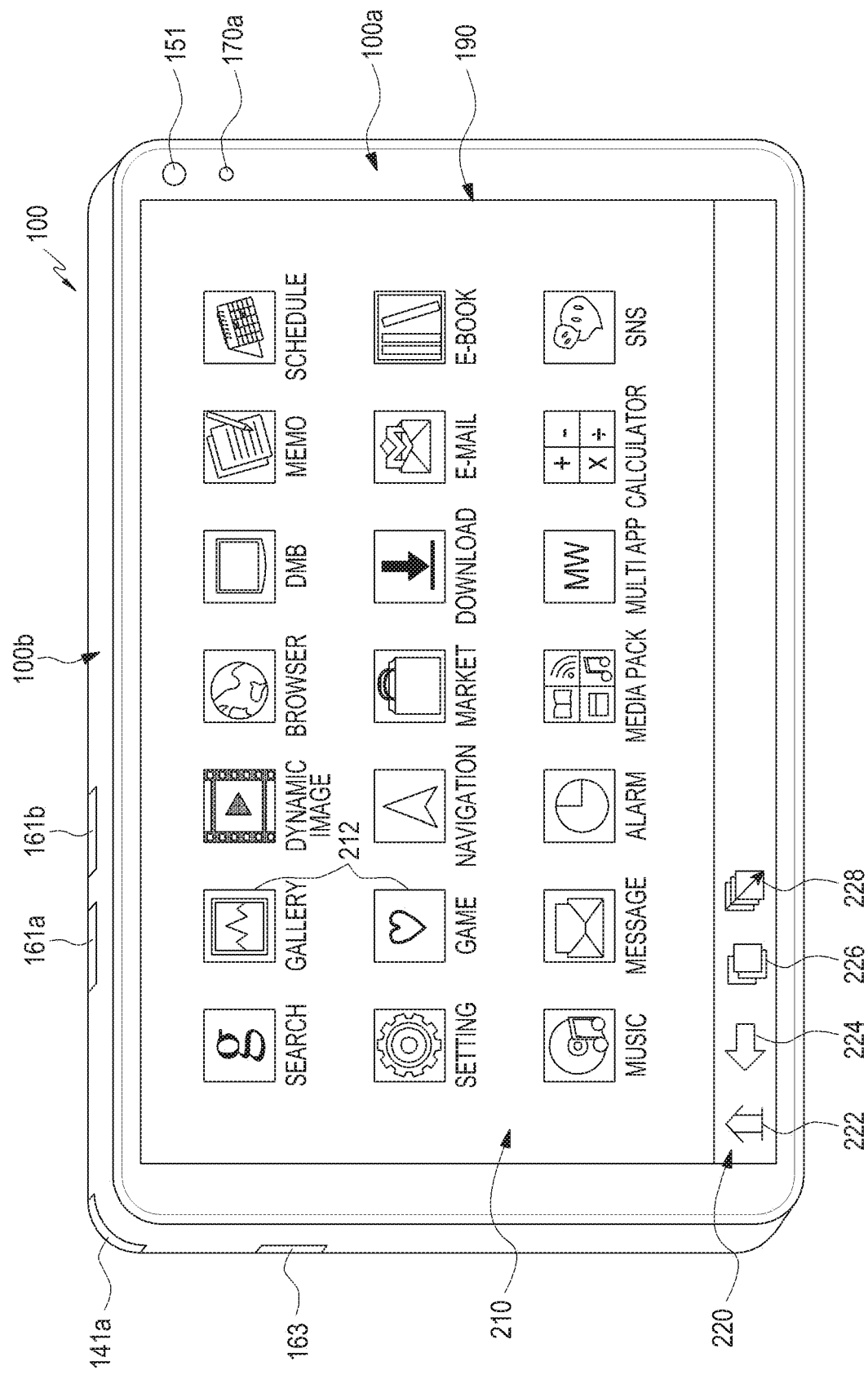
FIG. 2 is a perspective view of an apparatus including a touch screen according to an embodiment of the present invention.

FIG. 2 is a perspective view of a mobile apparatus according to an embodiment of the present invention.

Referring to FIG. 2, the touch screen 190 is disposed on the center of a foreside 100a of the apparatus 100. The touch screen 190 is formed to occupy a majority of the foreside 100a of the apparatus 100. The first camera 151 and an illuminance sensor 170a may be disposed on an edge of the foreside 100a of the apparatus 100. On a lateral side 100b of the apparatus 100, for example, a power/reset button 160a, a volume bottom 161b, the speaker 163, a terrestrial DMB antenna 141a for receiving broadcasting, a microphone (not illustrated), a connector (not illustrated), and the like may be disposed. On a back side (not illustrate) of the apparatus 100, a second camera (not illustrated) may be disposed.

The touch screen 190 may include a main screen 210 and a menu key collection stack 220. In FIG. 2, a horizontal length of each of the apparatus 100 and the touch screen 190 is longer than a vertical length. In this example, it is defined that the touch screen is disposed in the horizontal direction.

The main screen 210 corresponds to a region where a single application or a plurality of applications are executed. In FIG. 2, a home screen is displayed on the touch screen 190. The home screen is a screen that is displayed first on the touch screen 190 when the apparatus 100 is powered on. On the home screen, a plurality of application execution icons 212 stored in the apparatus 100 are displayed in rows and columns. The application execution icons 212 may be formed to be icons, buttons, or texts and the like. When each application execution icon 212 is touched, an application corresponding to the touched application execution icon 212 may be executed and may be displayed on the main screen 210.

The menu key collection stack 220 is elongated in the horizontal direction from the bottom of the touch screen 190, and includes standard function buttons 222 through 228. The home screen shift button 222 displays the home screen on the main screen 210. For example, when the home screen shift key 222 is touched while the applications are executed on the main screen 210, the home screen of FIG. 2 is displayed on the main screen 210. A back button 224 displays a screen that was executed immediately before a currently executed screen, or terminates the most recently used application. The multi-view mode button 226 displays, on the main screen 210, applications based on a multi-view mode. The mode switch button 228 switches a plurality of currently executed applications into different modes and displays them on the main screen 220. For example, when the mode switch button 228 is touched, switching may be performed between an overlap mode that displays the plurality of applications to overlap each other and a split mode that separately displays the plurality of applications in different regions on the main display screen 220, in the apparatus 100.

Also, a top bar (not illustrated) to display a state of the apparatus 100, such as charge state of a battery, a strength of a received signal, a current time, and the like, is formed on the top of the touch screen 190.

Based on an operating system (OS) of the apparatus 100 or an application executed in the apparatus 100, the menu key collection stack 220 and the top bar (not illustrated) may not be displayed on the touch screen 190. When both the menu key collection stack 220 and the top bar (not illustrated) are not displayed on the touch screen 190, the main screen 210 may be formed on the entire region of the touch screen 190. Also, the menu key collection stack 220 and the top bar (not illustrated) may be semitransparently displayed on the main screen 210 by overlapping each other.

Figure 3A:
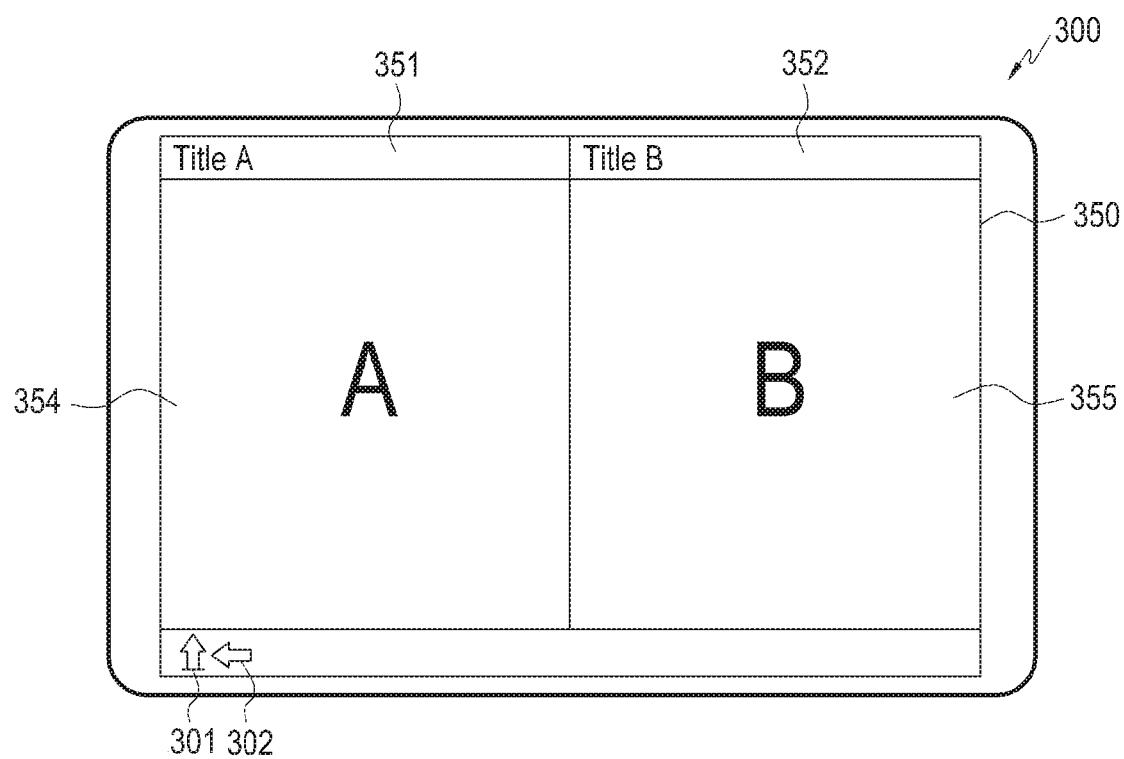
FIG. 3A is a diagram illustrating an apparatus including a touch screen that includes a first region and a second region according to an exemplary embodiment of the present invention.

FIG. 3A is a diagram illustrating an apparatus including a touch screen that includes a first region and a second region according to an exemplary embodiment of the present invention.

Referring to FIG. 3A, an apparatus 300 may include a touch screen 350. The touch screen 350 may render various graphics, text, images icons, icons, multimedia, an application execution screen, and the like and may display them, as described in the foregoing. The apparatus 300 may display, on the touch screen 350, first and second title bars 351 and 352, first and second application execution screens 354 and 355, and menu keys 301 and 302. The apparatus 300 may divides the touch screen 350 into two regions. More specifically the apparatus 300 does not divide the touch screen 350 physically, but divides a range of pixels into two regions. The apparatus 300 sets a first pixel range for the first application and a second pixel range for the second application. The apparatus 300 displays the first application on the first pixel range and the second application on the second pixel range.

The first and second title bars 351 and 352 may display a character, a number, a figure, or the like for identifying a first application and a second application. Although the first and second title bars 351 and 352 may be embodied as a bar that is elongated in the horizontal direction, the present invention is not limited thereto, and the first and second title bars 351 and 352 may be any graphical element that displays the identification of respective applications.

Each of the first and second application execution screens 345 and 355 may display an independent application execution screen. The first and second application execution screens 354 and 355 may be provided in a substantially rectangular shape and may be disposed below the first and second title bars 351 and 352, respectively, or at any suitable location of the touch screen 350. The first and second application execution screens 354 and 355 may display texts, multimedia, and the like according to a configuration of an application.

The first title bar 351 and the first application execution screen 354 may be referred to as a window, such as the first window 191 of FIG. 1B. A window may be a screen that simultaneously displays an application execution screen of an application and an identity in association with the application, and may include at least one view. A view may be a single independent display unit, and may be an object that provides a visual image. For example, the view may be a view to display a designated characteristic, and may include a text view to display a previously designated character on a coding level, an image view to display an image on a resource, a file, and a web, and the like.

The apparatus 300 may respectively display a first application and a second application on the first window and the second window. That is, the execution or termination of the first application may not affect the execution or termination of the second application. Accordingly, when the first application is terminated, the second application may be displayed on a second window including the second title bar 352 and second application execution screen 355. However, the present invention is not limited thereto, and the second application may be displayed on the entirety of the first and the second windows.

The menu keys 301 and 302 may provide a function of manipulating general operations of the apparatus 300. For example, when the user touches a menu key 301, the apparatus 300 may provide a menu screen. When the user touches the menu key 302, the apparatus 300 may display again a screen that was previously displayed. The manipulation based on the touch on the menu keys 301 and 302 may be merely an example, and those skilled in the art may readily understand various examples of manipulating the general operations of the apparatus 300 through a single manipulation or a combination of manipulation. The menu keys 301 and 302 may be provided in a rectangular shaped area that is elongated in a horizontal direction in a portion of the touch screen 350 in FIG. 3A, or may be displayed at any suitable location or in any suitable manner on the touch screen 350. Although the menu keys 301 and 302 may be embodied in a shape displayed on the touch screen 350 as described in the foregoing, the present invention is not limited thereto. The menu keys 301 and 302 may be embodied in any suitable shape in the touch screen 350, or may be embodied as physical buttons in a housing of the apparatus 100.

Figure 3B:
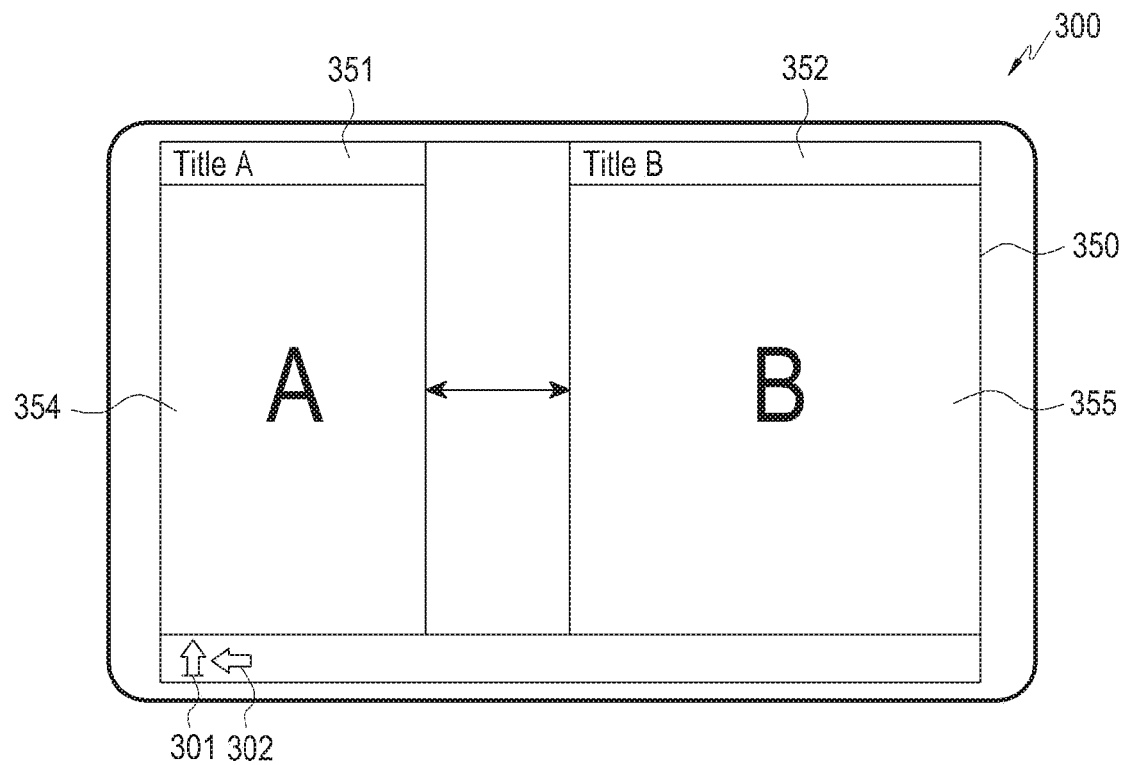
FIG. 3B is a diagram illustrating an apparatus including a touch screen that includes a first region and a second region according to another exemplary embodiment of the present invention.

FIG. 3B is a diagram illustrating an apparatus including a touch screen that includes a first window and a second window according to another exemplary embodiment of the present invention.

Referring to FIG. 3B, unlike the embodiment of FIG. 3A, the first window including the first title bar 351 and the first application execution screen 354 may be disposed at a predetermined distance from the second window that includes the second title bar 352 and the second execution screen 355, as illustrated in FIG. 3B. However, the present invention is not limited thereto, and the first window including the first title bar 351 and the first application execution window 354 may be separately displayed at any suitable distance from the second window including the second title bar 352 and the second application execution window 355.

Figure 3C:
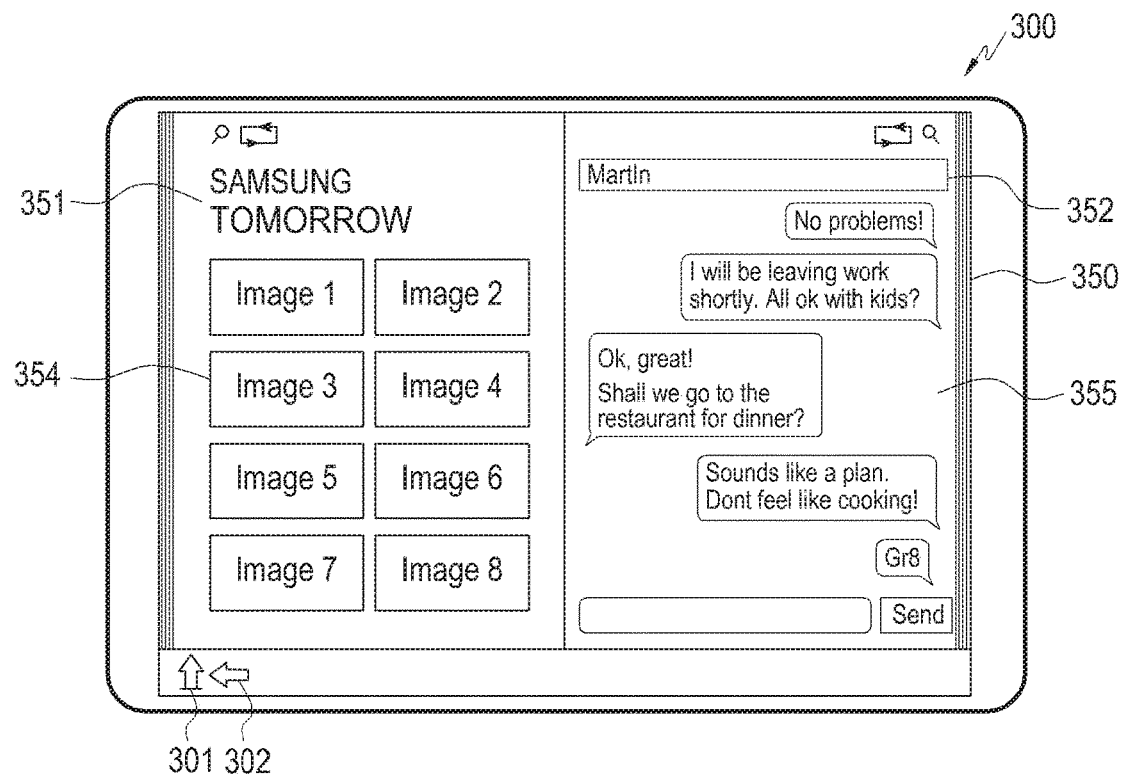
FIG. 3C is a diagram illustrating an example according to an exemplary embodiment of the present invention.

FIG. 3C is a diagram of an example embodied according to an exemplary embodiment of the present invention.

Referring to FIG. 3C, a first application and a second application may be displayed as displayed on each page of a book. The touch screen 350 may display the first title bar 351, the first application execution screen 354, the second title bar 352, and the second application execution screen 355 as shown in FIG. 3C.

Figure 3D:
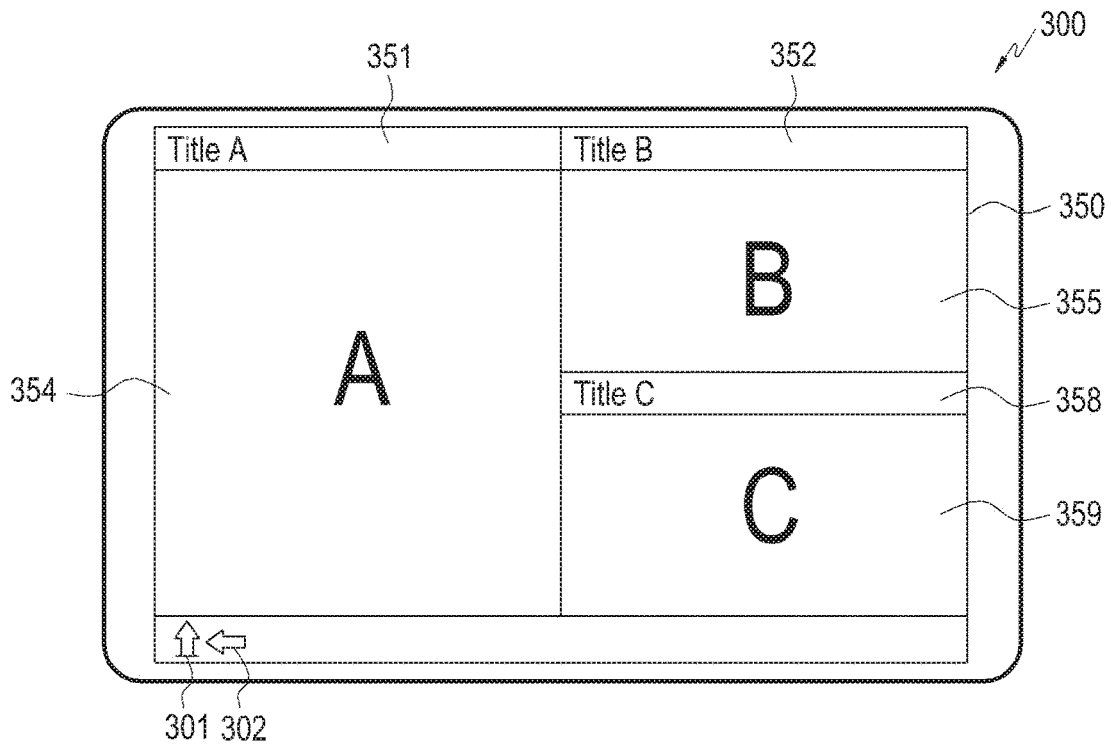
FIG. 3D is a diagram illustrating an apparatus including a touch screen that includes a first window, a second window, and a third window according to an exemplary embodiment of the present invention.

FIG. 3D is a diagram illustrating an apparatus including a touch screen that includes a first window, a second window, and a third window according to an exemplary embodiment of the present invention.

Referring to FIG. 3D, the touch screen 350 may display three windows, in contrast to the displaying of the two windows as shown in FIGS. 3A and 3B. In FIG. 3D, the first window including the first title bar 351 and the first application execution screen 354, the second window including the second title bar 352 and the second application execution screen 355, and a third window including a third title bar 358 and a third application execution screen 359 may be displayed on the touch screen 350.

Figure 4A:
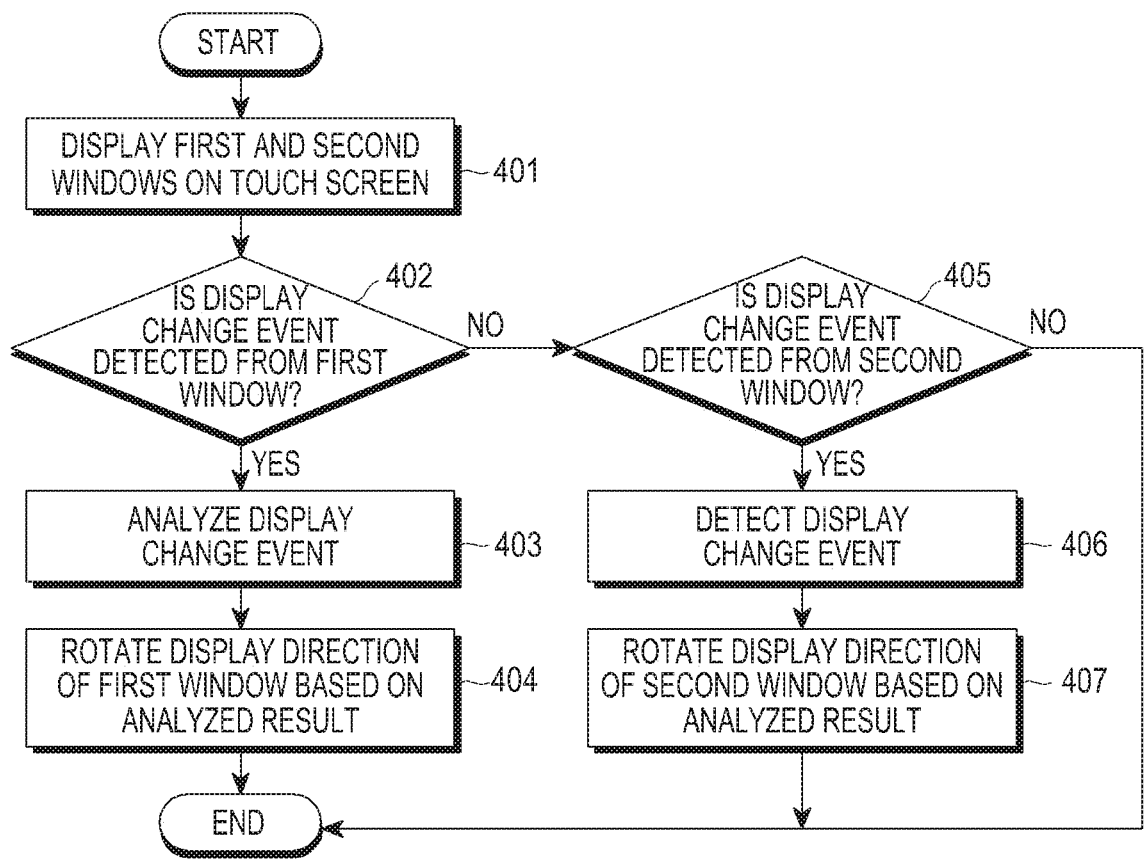
FIGS. 4A and 4B are flowcharts illustrating a control method of an apparatus including a touch screen according to an exemplary embodiment of the present invention.

FIG. 4A is a flowchart illustrating a control method of an apparatus including a touch screen according to an embodiment of the present invention; and FIGS. 5A through 5C are diagrams illustrating a touch screen that includes a reversal region according to various exemplary embodiments of the present invention.

Referring to FIG. 4A and FIGS. 5A to 5C, each step in FIG. 4A will be described with reference to FIGS. 5A through 5C. A first application and a second application may be respectively displayed on a first window and a second window on the touch screen 350, in step 401. As shown in FIG. 5A, the controller 110 may respectively display the first application on a first window 501 and the second application on a second window 502. A step of executing the first and second applications may be performed before step 401.

The controller 110 may determine whether a display change event is detected from the first window in step 402. If no display change event is detected at step 402, then the controller 110 may determine whether a display change event is detected from the second window in step 405. Here, the display change event may correspond to inputting an external input, from the user, that rotates, reverses, or shifts a displayed screen according to an external interface input scheme.

According to an exemplary embodiment of FIG. 5A, the display change event may correspond to a drag gesture input from a title bar 503 of the second window 502 to a boundary between the second window 502 and a menu key collection stack 504. Here, the drag gesture may correspond to a gesture that touches a first point of a touch screen, and drags up to a second point by maintaining the contact with the touch screen. The drag gesture from the top to the bottom, as described in the foregoing, may be a motion similar to a motion that reverses the top and bottom of a screen, and may be a gesture corresponding to a user's intuition. The display change event may be referred to as a screen reverse gesture.

If the display change event from the first window is detected in step 402 or if the display change event from the second window is detected in step 405, then the controller 110 or the second controller 110b may detect a display change event such as a drag gesture input, and may respectively analyze the detected display change event in steps 403 or 406. For example, the controller 110 may read a lookup table associated with a relationship between a display change event and a changed display screen, previously stored in the storage unit 175, and may analyze the display change event according to the read lookup table. In particular, when the display change event occurs, the controller 110 may process the display change event in a framework through a kernel and may control to change a display of a screen.

Next, in steps 404 and 407, the controller 110 may control to display a changed screen respectively based on the analyzed results of steps 403 and 406. In other words, the controller 110 may analyze the display change event in step 403 and may then, in step 404, control to rotate a display direction of the first window based on the analyzed result of step 403. Also, the controller 110 may analyze the display change event in step 406 and may then, in step 407, control to rotate a display direction of the first window based on the analyzed result of step 406.

Referring to FIG. 5B, a display direction of a second application displayed in the second window 502 is displayed by being reversed in the up and down directions, that is, being rotated by 180 degrees. The second title bar 503 is also reversed and is disposed on the bottom of the second application execution screen 502. Here, the display direction may correspond to a direction in which an application execution screen displayed on the touch screen is displayed.

Based on the configuration as described in the foregoing, inconvenience due to the overlapping of workspaces in a case where two users respectively use a first application and a second application, may be overcome. For example, when the first and second applications are respectively displayed in the first and second windows 501 and 502 in the same direction, as illustrated in FIG. 5A, two users may need to manipulate the touch screen in the state where the two users are close to each other and thus, there is inconvenience caused by physical space restraint. However, when the first application and the second application are displayed in different directions, i.e., in different orientations, as illustrated in FIG. 5B, then the two users may be able to manipulate the touch screen in the state where the two users face each other and thus, the space restraint may be overcome. Accordingly, a plurality of users may control a plurality of different applications, respectively, using an apparatus including a single touch screen.

Referring to FIG. 5C, the display change event may correspond to a drag gesture from the bottom of the second window 502 at a location of the menu key selection stack 504 to the top of the second window 502. The drag gesture from the bottom to the top may be a motion similar to a motion that reverses the bottom and the top of a screen, and may correspond to a user's intuition.

The controller 110 may detect a drag gesture input from the bottom of the second window 502 to the top, and may analyze the detected drag gesture input. The controller 110 may analyze the drag gesture input, and may control to reverse the reversed second window 502 and the menu key selection stack 504 again so as to display the second window 502 and the menu key selection stack 504 as illustrated in FIG. 5A.

Although the apparatus control method of FIG. 4A is associated with the case in which a single display change event is independently input to the first window or the second window, the present invention is not limited thereto. When display change events are simultaneously and respectively input to the first window and the second window, the apparatus may change screens according to the display change events and display the changed screens.

Figure 4B:
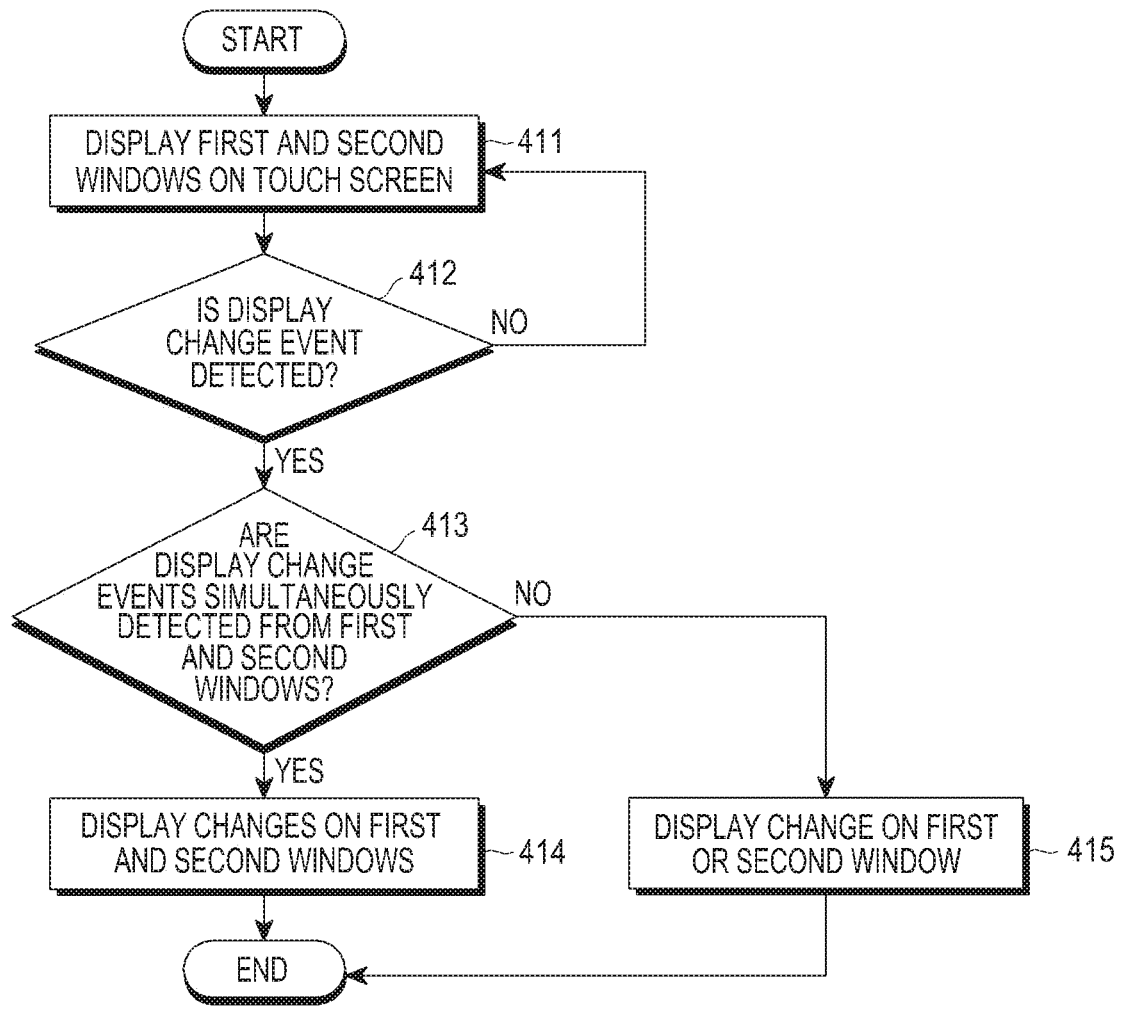

FIG. 4B is a flowchart illustrating an apparatus control method according to another exemplary embodiment of the present invention.

A touch screen 195 may display a first application in a first window and a second application in a second window in step 411. Next, the controller 110 may determine whether a display change event is detected in step 412. When the display change event is not detected in step 412, then the first and second applications are respectively and continuously displayed on the first and second windows. If the display change even is detected in step 412, then the controller 110 may detect whether display change events are simultaneously detected from the first and second windows in step 413. When the display change events are simultaneously detected from the first and second windows in step 413, then the apparatus may simultaneously change the first and second windows and may display the changes in step 414. When a display change event is detected from only one of the first and second windows in step 413, then the apparatus may change a window where the display change event is detected and may display the change in step 415.

FIGS. 6A through 6D are conceptual diagrams illustrating a display change event and a changed screen according to another exemplary embodiment of the present invention.

Referring to FIG. 6A, the touch screen 195 may respectively display a first application and a second application on a first window 601 and a second window 602. A display change event in the exemplary embodiment of FIG. 6A may correspond to a drag gesture input from a top 603 of the second window 602 to a point 505 of the right end of the second window 602. The drag gesture from the top to the right end may be a motion similar to a motion that rotates a screen clockwise by 90 degrees, and may correspond to a user's intuition. The display change event that rotates a screen in a predetermined direction may be referred to as a screen rotate gesture.

FIG. 6B illustrates a screen that is changed according to the inputting of the drag gesture from the top 603 to the point 506, as illustrated in FIG. 6A. Referring to FIG. 6B, the second application is rotated clockwise by 90 degrees and is displayed on the second window 602. Also, a title bar of the second application may be disposed on the right side of the second window 602. The display change event detected in FIG. 6B may correspond to inputting a drag gesture from a point 506 on the right end of the second window 602 to a point at a boundary between the first window 601 and the second window 602. The drag gesture from the right to the left, as described in the foregoing, may be a motion similar to a motion that switches or swaps locations between the right and the left areas and may correspond to a user's intuition.

FIG. 6C illustrates a screen that is changed according to the inputting of the drag gesture from the right to the left, as shown in FIG. 6B. As illustrated in FIG. 6C, according to the motion illustrated in FIG. 6B, the second application is reversed in the left and right direction and is displayed on the second window 602. A title bar of the second application is also disposed on the left side of the second window 602. A display change event in an exemplary embodiment of FIG. 6C may be inputting a drag gesture from a bottom 604 of the second window 602 to a point 607 of the left side of the second window 602, the left side being adjacent to the first window 601. The drag gesture from the bottom 604 to the point 607 of the left side may be a motion similar to a motion that rotates a screen clockwise by 90 degrees, and may correspond to a user's intuition.

FIG. 6D illustrates a screen that is changed according to the inputting of the drag gesture from the bottom 604 to the point 607 of the left side, as shown in FIG. 6C. As illustrated in FIG. 6D, the second application is rotated clockwise by 90 degrees and is displayed on the second window 602. A title bar of the second application is also disposed on the left side of the second window 602. As described in the foregoing, the apparatus may change a screen in various schemes based on various display change events, and may display the changed screen and thus, user convenience, more particularly, the user convenience when a plurality of users use the apparatus 100, may be increased.

Figure 7A:
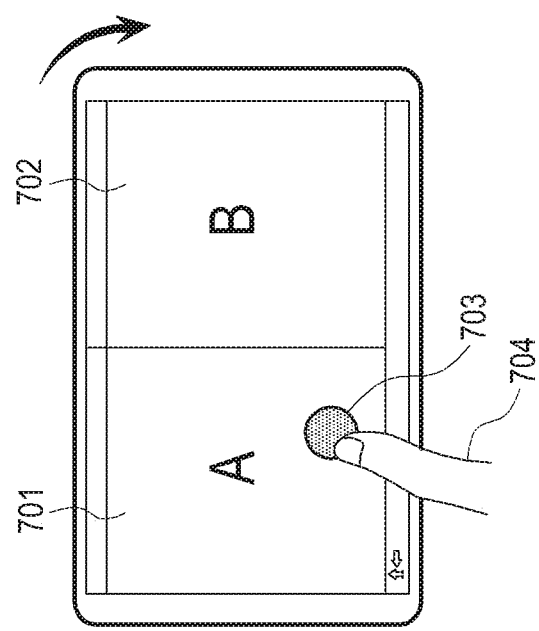
FIGS. 7A and 7B are diagrams illustrating a display change event according to another exemplary embodiment of the present invention.
Figure 7B:
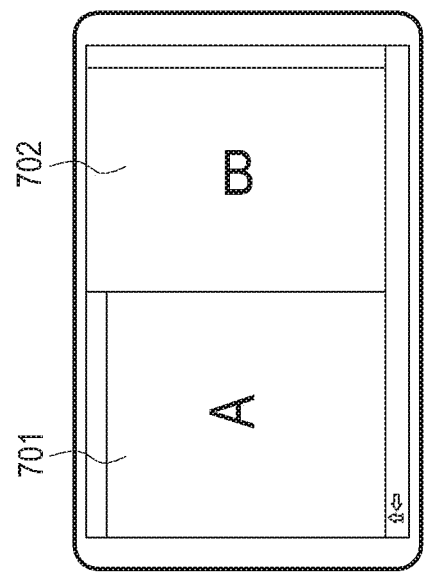

FIGS. 7A and 7B are diagrams illustrating a display change event according to another exemplary embodiment of the present invention.

Referring to FIG. 7A, a touch screen may display a first application on a first window 701 and display a second application on a second window 702. A display change event in FIG. 7A may be a motion that rotates the apparatus 100 clockwise while a user 704 touches a point 703 of the first window 701. As described in the foregoing, the motion that rotates the apparatus in a predetermined direction while the user 704 touches the first window 701 or the second window 702 may be a motion similar to a motion that rotates a display of a window that is not touched while maintaining a display of a window where a touch is maintained, and may correspond to a user's intuition.

FIG. 7B illustrates a display screen that is changed according to the display change event of FIG. 7A. Referring to FIG. 7B, the display of the first window 701, where the touch to the point 703 is maintained, as shown in FIG. 7A, may not be changed. The second window 702 where a touch to the point 703 is not input, as shown in FIG. 7A, may be displayed by being rotated clockwise by 90 degrees based on the rotation of the apparatus 100 to the right. A second title bar is also disposed on the right side of the second window 702.

Figure 8:
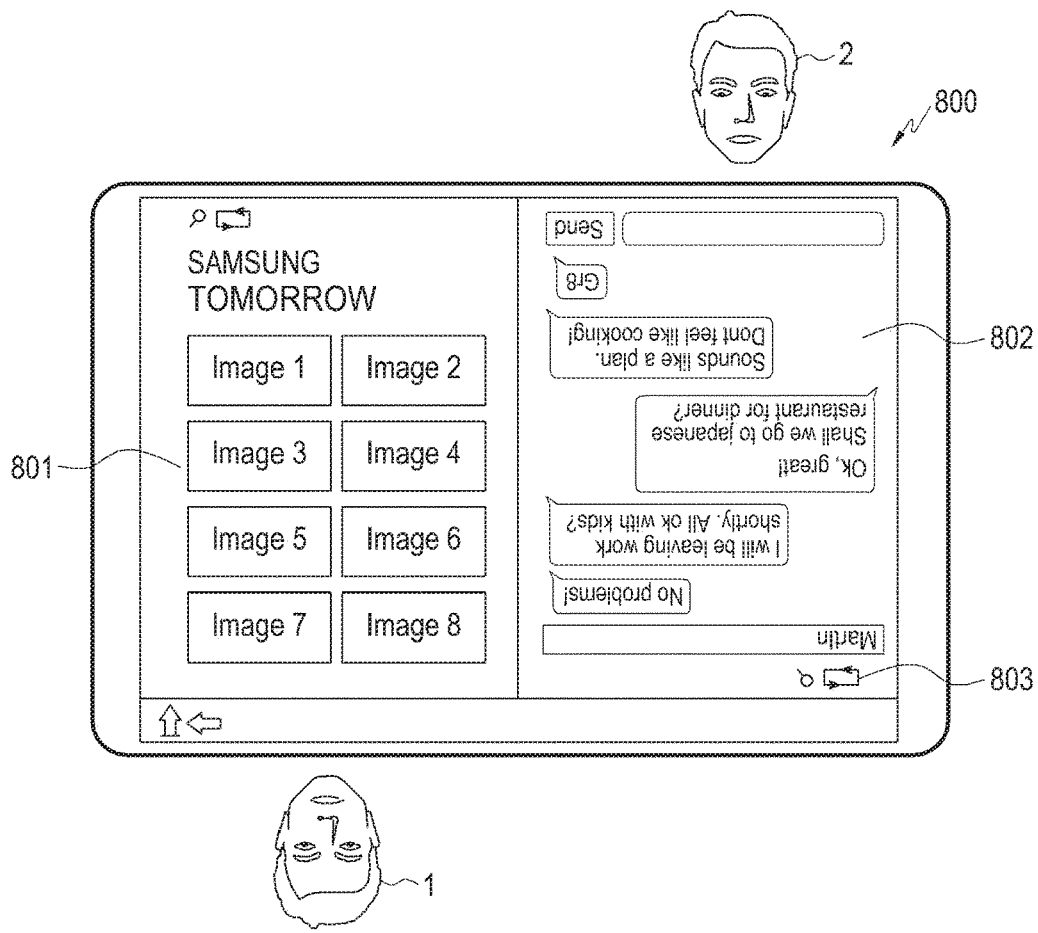
FIG. 8 is a diagram illustrating a display change event according to another exemplary embodiment of the present invention.

FIG. 8 is a diagram illustrating a display change event according to another embodiment of the present invention.

Referring to FIG. 8, an apparatus 800 may display a first application on a first window 801 and display a second application on a second window 802. The second application is displayed on the second window 802 by being reversed in the up and down directions as compared to the first window 801. In the second window 802, an up and down reverse icon or soft key 803 is included. By touching the up and down reverse icon or soft key 803, the user may reverse a window including the designated up and down reverse icon or soft key 803. Referring to FIG. 8, when a user 1 works on the first application and a user 2 works on the second application, workspaces may not overlap each other and thus, user convenience may be increased.

Figure 9:
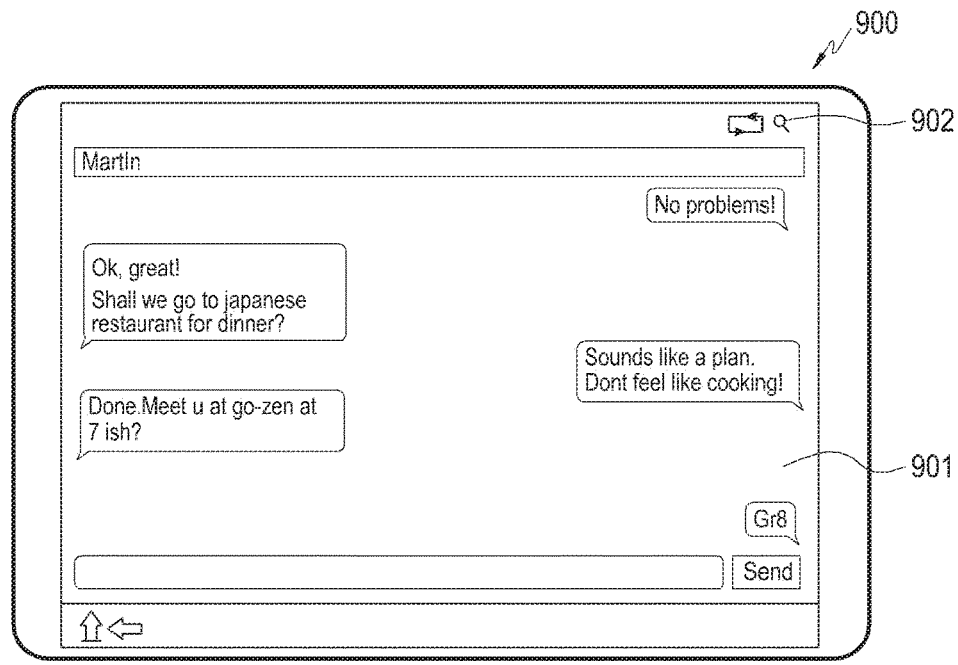
FIG. 9 is a diagram illustrating switching one of applications into an entire screen according to another exemplary embodiment of the present invention.

FIG. 9 is a diagram illustrating switching one of applications into an entire screen according to another exemplary embodiment of the present invention.

Referring to FIG. 9, an apparatus 900 may display a first application on an entire screen 901. In the entire screen 901, an entire screen icon or soft key 902 is included. By touching the entire screen icon or soft key 902, a user may switch a region including the designated entire screen icon or screen soft key 902 so as to be displayed on the entire screen. In a case where a predetermined application is switched to be displayed on the entire screen, the apparatus 900 may maintain remaining applications to be executed while not displaying them. The user may switch the entire screen to display a screen having the first application and the second application respectively displayed on a first region and a second region by inputting a display change event corresponding touching the entire screen icon or soft key 902 again.

Figure 10:
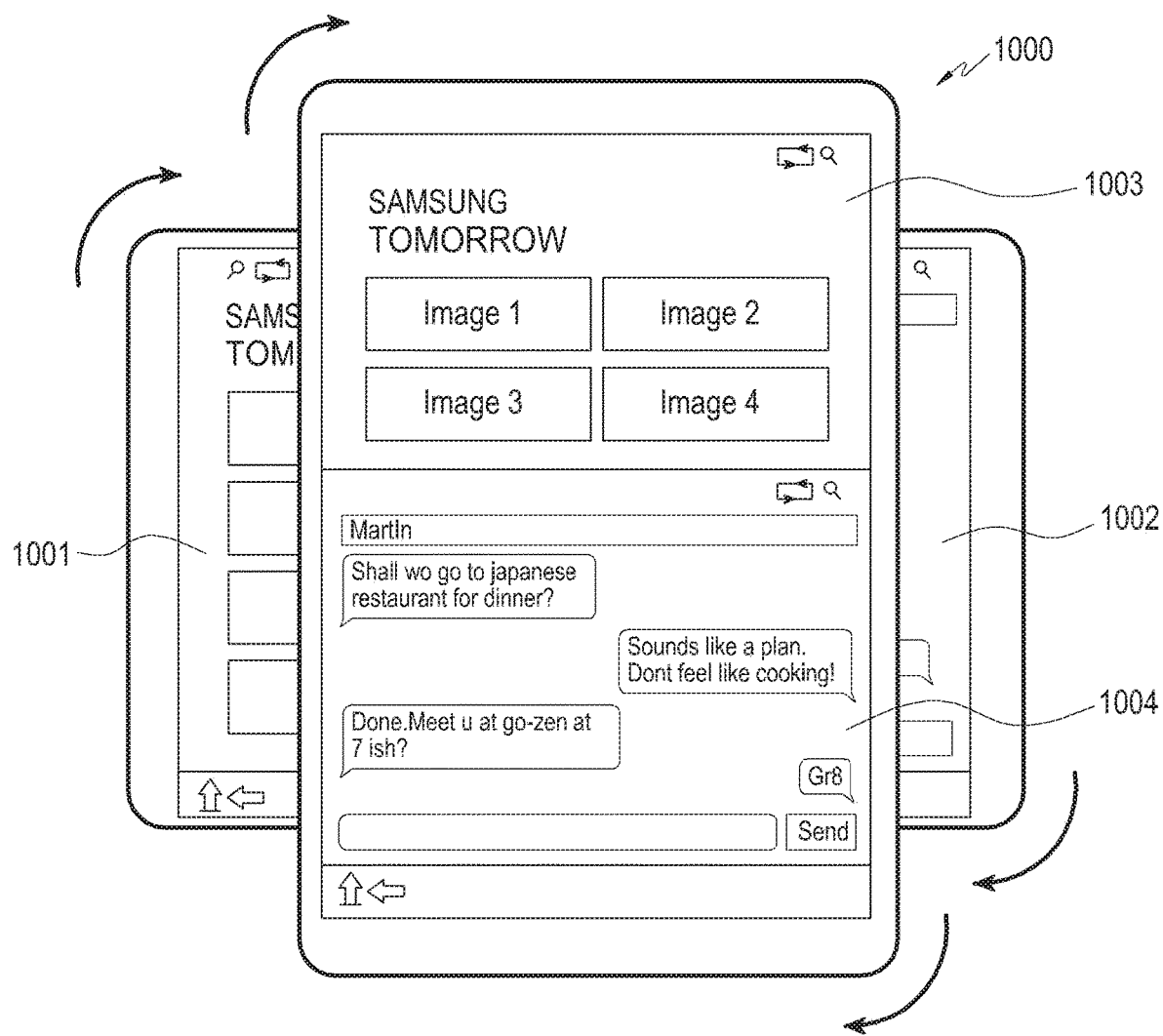
FIG. 10 is a diagram illustrating a display change event that rotates an apparatus.

FIG. 10 is a diagram illustrating a display change event that rotates an apparatus.

Referring to FIG. 10, a display change event may correspond to rotating an apparatus 1000. The controller 110 may determine that a display change event occurs when rotation of the apparatus 1000 is detected, for example, a rotation for which an angle is greater than or equal to a threshold value is detected using a gyro sensor. Rotating the apparatus 1000 in a predetermined direction, for example, rotating the apparatus clockwise, as shown in FIG. 10, may be a motion similar to a motion that rotates a screen clockwise, and may correspond to a user's intuition.

In FIG. 10, the apparatus 1000 displays a first application on a first region 1001 and displays a second application on a second region 1002. After the rotation, the first application and the second application may be rotated by 90 degrees and may be respectively displayed on a first region 1003 and a second region 1004. A menu key collection stack is displayed at a bottom of the screen, and may be displayed on a right side of the screen. However, the present invention is not limited to sensing and/or detecting rotation, and exemplary embodiments of the present invention may include sensing tilting of the apparatus using a motion sensor, and rotating the first and second applications by 90 degrees and displaying the applications on the first region 1003 and the second region 1004 as described in the foregoing.

Figure 11:
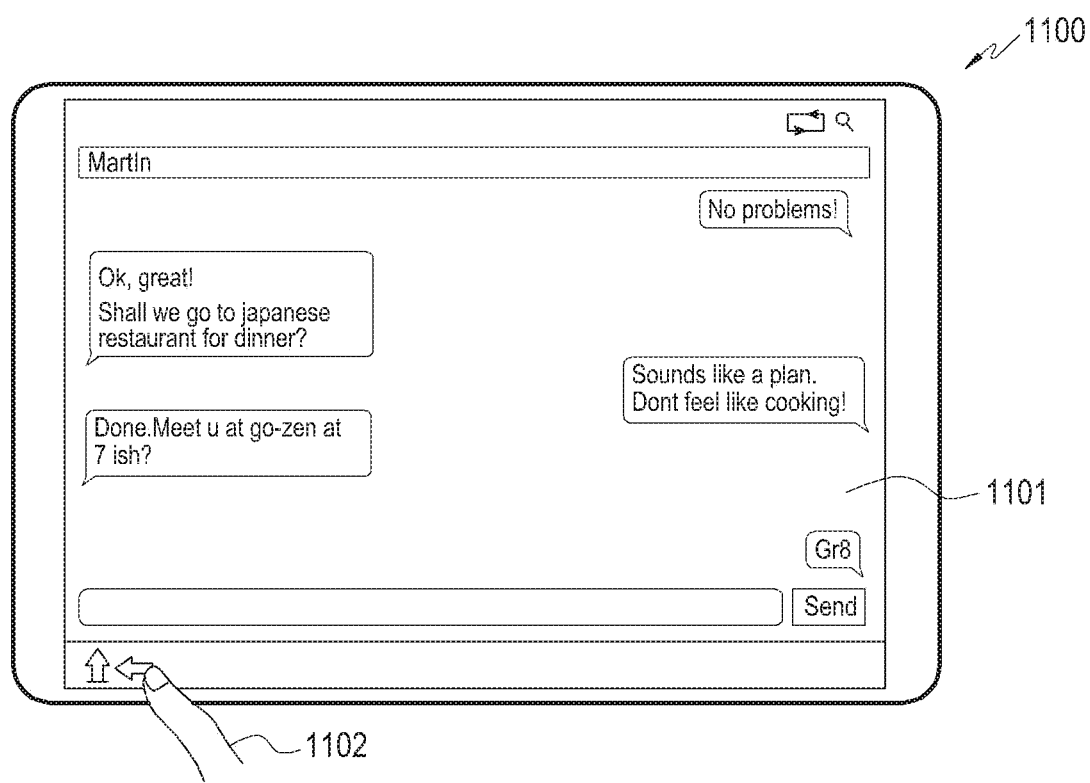
FIG. 11 is a diagram illustrating a display change event according to another exemplary embodiment of the present invention.

FIG. 11 is a diagram illustrating a display change event according to another exemplary embodiment of the present invention. A user may terminate a predetermined application by touching an end icon or soft key 1102. An apparatus 1100 may detect a display change event that designates the end icon or soft key 1102, and may terminate a corresponding application when the apparatus 100 determines that the display change event occurs. When the corresponding application is terminated, the display may be changed to a display in which a remaining application is displayed on an entire screen 1101.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. An electronic device, comprising:
a touch screen; and
one or more processors configured to control to:
  display, on the touch screen, a first window and a second window, wherein a first screen is displayed in a first direction with respect to the electronic device on the first window and a second screen is displayed in the first direction with respect to the electronic device,
  receive, through the touch screen, a first touch input on the first window,
  detect a motion of rotating or tilting the electronic device clockwise or counterclockwise while the first touch input is maintained on a first position of the first window,
  in response to detecting the motion of rotating or tilting the electronic device while the first touch input is maintained on the first position, determine whether an angle of the electronic device being rotated or tilted is greater than or equal to a threshold value,
  based on determining that the angle of the electronic device being rotated or tilted is less than the threshold value, display, on the touch screen, the first screen and the second screen in the first direction with respect to the electronic device while the electronic device is rotated or tilted, and based on determining that the angle of the electronic device being rotated or tilted is greater than or equal to the threshold value, display, on the touch screen, the first screen in the first direction with respect to the electronic device while the electronic device is rotated or tilted and rotate the second screen to be displayed in a second direction with respect to the electronic device, wherein the second direction is vertical to the first direction, and wherein an orientation of the second screen being rotated corresponds to an orientation of the electronic device being rotated or tilted.

2. The electronic device of claim 1,
wherein the first screen corresponds to an execution screen of a first application,
wherein the second screen corresponds to an execution screen of a second application, and
wherein the first application is different from the second application.

3. The electronic device of claim 1,
wherein the one or more processors are further configured to control to:
after displaying the second screen in the second direction with respect to the electronic device, receive, through the touch screen, a drag input from the first position on which the first touch input is maintained to a second position of the first window different from the first position, and
based on receiving the drag input, rotate the first screen clockwise or counterclockwise.

4. The electronic device of claim 1,
wherein at least one of the first window or the second window comprises an entire screen icon, and
wherein the one or more processors are further configured to control to:
receive, through the touch screen, a second touch input selecting the entire screen icon included on the at least one of the first window or the second window, and
in response to receiving the second touch input, display, on the touch screen, a screen comprising the selected entire screen icon as an entire screen.

5. The electronic device of claim 1,
wherein at least one of the first window or the second window comprises an exit icon, and
wherein the one or more processors are further configured to control to:
receive, through the touch screen, a third touch input selecting the exit icon included on the at least one of the first window or the second window, and
in response to receiving the third touch input, terminate displaying a screen comprising the selected exit icon and display, on the touch screen, another screen as an entire screen.

6. A method for controlling an electronic device, the method comprising:
displaying, on a touch screen of the electronic device, a first window and a second window, wherein a first screen is displayed in a first direction with respect to the electronic device on the first window and a second screen is displayed in the first direction with respect to the electronic device;
receiving, through the touch screen, a first touch input on the first window;

detecting a motion of rotating or tilting the electronic device clockwise or counterclockwise while the first touch input is maintained on a first position of the first window;

in response to detecting the motion of rotating or tilting the electronic device while the first touch input is maintained on the first position, determining whether an angle of the electronic device being rotated or tilted is greater than or equal to a threshold value;

based on determining that the angle of the electronic device being rotated or tilted is less than the threshold value, displaying, on the touch screen, the first screen and the second screen in the first direction with respect to the electronic device while the electronic device is rotated or tilted; and based on determining that the angle of the electronic device being rotated or tilted is greater than or equal to the threshold value, displaying, on the touch screen, the first screen in the first direction with respect to the electronic device while the electronic device is rotated or tilted and rotating the second screen to be displayed in a second direction with respect to the electronic device, wherein the second direction is vertical to the first direction, and wherein an orientation of the second screen being rotated corresponds to an orientation of the electronic device being rotated or tilted.

7. The method of claim 6,
wherein the first screen corresponds to an execution screen of a first application,
wherein the second screen corresponds to an execution screen of a second application, and
wherein the first application is different from the second application.

8. The method of claim 6, further comprising:
after displaying the second screen in the second direction with respect to the electronic device, receiving, through the touch screen, a drag input from the first position on which the first touch input is maintained to a second position of the first window different from the first position, and
based on receiving the drag input, rotating the first screen clockwise or counterclockwise.

9. The method of claim 6,
wherein at least one of the first window or the second window comprises an entire screen icon, and
wherein the method further comprises:
receiving, through the touch screen, a second touch input selecting the entire screen icon included on the at least one of the first window or the second window; and
in response to receiving the second touch input, displaying, on the touch screen, a screen comprising the selected entire screen icon as an entire screen.

10. The method of claim 6,
wherein at least one of the first window or the second window comprises an exit icon, and
wherein the method further comprises:
receiving, through the touch screen, a third touch input for selecting the exit icon included on the at least one of the first window or the second window; and
in response to receiving the third touch input, terminating displaying a screen comprising the selected exit icon and displaying, on the touch screen, another screen as an entire screen.

11. A non-transitory computer-readable storage medium storing instructions, the instructions being configured to, when executed by one or more processors of an electronic device, cause the one or more processors to:
- display, on a touch screen of the electronic device, a first window and a second window, wherein a first screen is displayed in a first direction with respect to the electronic device on the first window and a second screen is displayed in the first direction with respect to the electronic device;
- receive, through the touch screen, a first touch input on the first window;
- detect a motion of rotating or tilting the electronic device clockwise or counterclockwise while the first touch input is maintained on a first position of the first window;
- in response to detecting the motion of rotating or tilting the electronic device while the first touch input is maintained on the first position, determine whether an angle of the electronic device being rotated or tilted is greater than or equal to a threshold value;
- based on determining that the angle of the electronic device being rotated or tilted is less than the threshold value, display, on the touch screen, the first screen and the second screen in the first direction with respect to the electronic device while the electronic device is rotated or tilted; and
- based on determining that the angle of the electronic device being rotated or tilted is greater than or equal to the threshold value, display, on the touch screen, the first screen in the first direction with respect to the electronic device while the electronic device is rotated or tilted and rotate the second screen to be displayed in a second direction with respect to the electronic device,
- wherein the second direction is vertical to the first direction, and
- wherein an orientation of the second screen being rotated corresponds to an orientation of the electronic device being rotated or tilted.

12. The non-transitory computer-readable storage medium of claim 11,
- wherein the first screen corresponds to an execution screen of a first application,
- wherein the second screen corresponds to an execution screen of a second application, and
- wherein the first application is different from the second application.

13. The non-transitory computer-readable storage medium of claim 11, wherein the instructions are further configured to, when executed, cause the one or more processors to control to:
- after displaying the second screen in the second direction with respect to the electronic device, receive, through the touch screen, a drag input from the first position on which the first touch input is maintained to a second position of the first window different from the first position; and
- based on receiving the drag input, rotate the first screen clockwise or counterclockwise.

14. The non-transitory computer-readable storage medium of claim 11,
- wherein at least one of the first window or the second window comprises an entire screen icon, and
- wherein the instructions are further configured to, when executed, cause the one or more processors to control to:
  - receive, through the touch screen, a second touch input for selecting the entire screen icon included on the at least one of the first window or the second window; and
  - in response to receiving the second touch input, display, on the touch screen, a screen comprising the selected entire screen icon as an entire screen.

15. The non-transitory computer-readable storage medium of claim 11,
- wherein at least one of the first window or the second window comprises an exit icon, and
- wherein the instructions are further configured to, when executed, cause the one or more processors to control to:
  - receive, through the touch screen, a third touch input for selecting the exit icon included on the at least one of the first window or the second window; and
  - in response to receiving the third touch input, terminate displaying a screen comprising the selected exit icon and display, on the touch screen, another screen as an entire screen.

* * * * *